No. 807,048. PATENTED DEC. 12, 1905.
A. G. RONAN.
TRANSMISSION GEAR FOR GAS ENGINES.
APPLICATION FILED AUG. 11, 1904.

2 SHEETS—SHEET 1.

Witnesses.
W. R. Blackhall.
Irene B. Buckle.

Inventor.
A. G. Ronan
by Egerton R. Case.
Atty.

No. 807,048. PATENTED DEC. 12, 1905.
A. G. RONAN.
TRANSMISSION GEAR FOR GAS ENGINES.
APPLICATION FILED AUG. 11, 1904.

2 SHEETS—SHEET 2.

Witnesses. Inventor:

UNITED STATES PATENT OFFICE.

ANSON GROVES RONAN, OF TORONTO, CANADA.

TRANSMISSION-GEAR FOR GAS-ENGINES.

No. 807,048.    Specification of Letters Patent.    Patented Dec. 12, 1905.

Application filed August 11, 1904. Serial No. 220,363.

*To all whom it may concern:*

Be it known that I, ANSON GROVES RONAN, machinist, a subject of the King of Great Britain, residing in the city of Toronto, in the county of York and Province of Ontario, Canada, have invented certain new and useful Improvements in Transmission-Gear for Gas-Engines, of which the following is a specification.

My invention relates to improvements in transmission-gear for gas-engines; and the objects of my invention are, first, to dispense with the usual half-time shaft and gearing thereon, making the drive-shaft perform functions of same; secondly, to reduce the weight of engines of this class; thirdly, to relieve the engine-axle of all undue strain; fourthly, to lower the drive-shaft as far as possible and keep same horizontal, so that when my engine is used for marine work the propeller will operate at the most efficient angle, and, fifthly, to vertically mount a pair of cylinders abreast and have them either together or singly operate the same drive-shaft.

The construction of my invention will be hereinafter described. The size of the pinions used is preferably one-half the size of the wheel keyed to the drive-shaft, so the said drive-shaft may be operated at one-half the speed of the pinions in order that the valves and igniter may be operated therefrom in the same manner in which they are now operated from the usual half-time shaft, as hereinafter more particularly explained.

Figure 1:
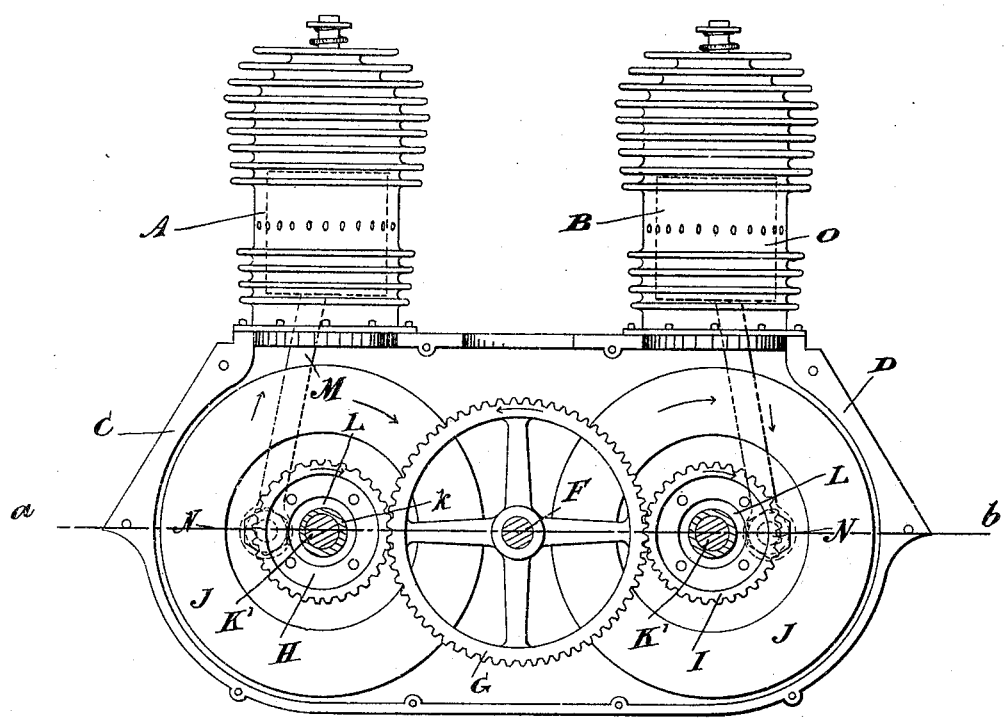
Figure 2:
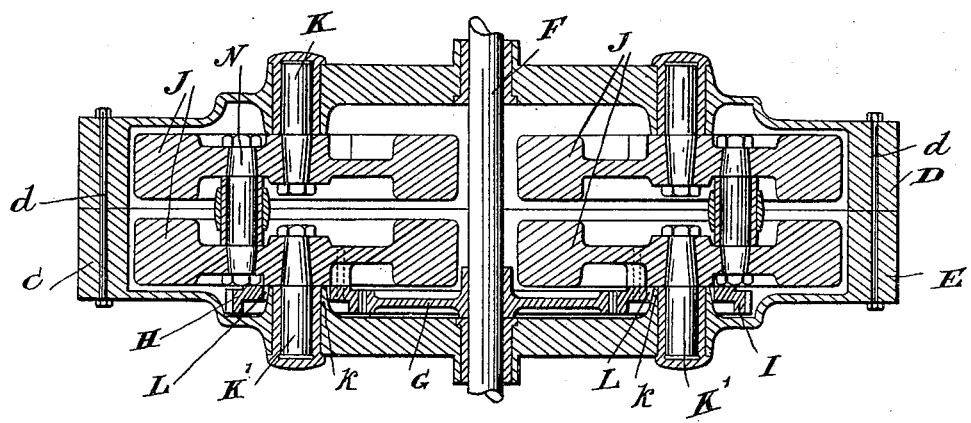
Figure 3:
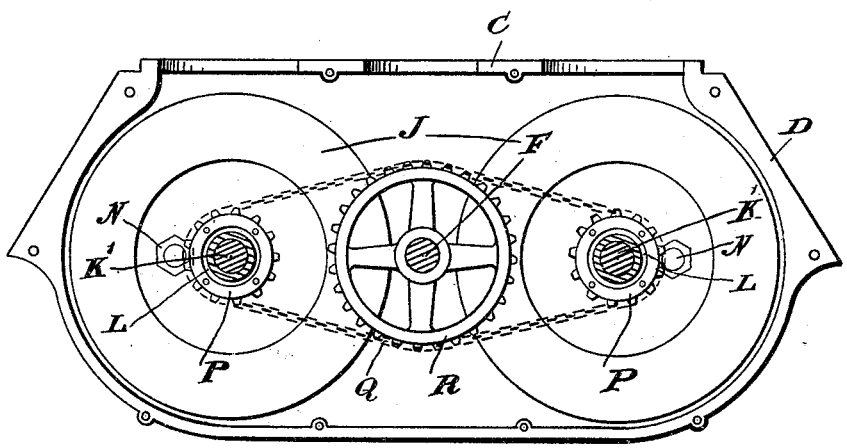

Figure 1 is a side elevation showing two engines equipped with my preferred form of transmission-gear designed for automobile-work. Fig. 2 is a horizontal cross-section on the line $a\,b$, Fig. 1. Fig. 3 is a side elevation, part of the engine-casing being removed, showing an alternative form of my transmission-gear for automobile-work.

In the drawings like characters of reference indicate corresponding parts in each figure.

The cylinders A and B are suitably secured in vertical position to a suitable engine-casing C, the preferred form of which consists of two halves D and E, secured together by bolts $d$. Held in any suitable bearings in said engine-casing is the drive-shaft F. My preferred form of transmission-gear consists of a gear-wheel G, keyed to said drive-shaft, which meshes with pinions H and I.

J represents the fly-wheels mounted on the stub-shafts K and K', held in suitable bearings in the engine-casing. In order to relieve the stub-shafts K' of all undue strain, I prefer to suitably secure the pinions H and I to their adjacent fly-wheels J. In order to do this, I cut away the center of each of the said pinions, so as to form hollow centers L therein, which envelop, without touching same, bearings $k$ for the stub-shafts K'. The pitmen M are secured to the wrist-pins N, which suitably connect the fly-wheels J in pairs.

Supposing the cylinder B is developing power, its piston O will force its connected pitman down in the direction indicated by arrow, thus rotating the fly-wheels and gearing in the direction indicated by arrows, thus transmitting power to the drive-shaft F. During this operation the cylinder A is of course idle. At the proper time the cylinder A will develop power and transmit same to the drive-shaft F in the manner before described, while the cylinder B is idle. The engines shown are four-part cycle; but it will be understood that I may use two-part-cycle engines without departing from the spirit of my invention. It is clearly apparent that the engines may be used together or singly. When one engine alone is used, it is my intention to open the valves in the cylinder of the idle engine, thus enabling same to cool itself off rapidly by drawing in and expelling pure air.

My engines will preferably be air-cooled, as shown, and are designed to be mounted in the front of the vehicle; but of course I do not confine myself to placing the engines in any particular position in the vehicle.

It is quite apparent that I may use one fly-wheel in place of each pair shown; but I prefer to use the four fly-wheels, as shown, as I find that the action of the forces on the engine and engine-casing are more evenly distributed thereby.

In place of the toothed gear before described I may use sprocket-pinions P and connect same by any suitable sprocket-chain Q to sprocket-wheel R, suitably secured to the drive-shaft F. The sprocket-pinions P would preferably be secured to the fly-wheels J after the manner in which the pinions H and I are secured thereto.

I of course may form the pinions H and I and sprocket-pinions P part of the fly-wheels J.

It is immaterial to my invention what kind of engine-casing and cylinders are used.

I do not confine myself to the construction herein shown and described, as same can be altered in many ways without departing from the spirit of my invention.

What I claim as my invention is—

1. In transmission-gear, the combination with the engine-casing; a first toothed pinion; the engine-pitman operating same; a second toothed pinion, and engine-pitman operating same, of the drive-shaft journaled in said engine-casing, and a toothed wheel keyed to said drive-shaft and in mesh with said pinions from which it receives energy.

2. In transmission-gear, the combination with the engine-casing; a first fly-wheel journaled in said engine-casing; a stub-shaft for same; a second fly-wheel journaled in said engine-casing; a stub-shaft for same; a toothed pinion secured to said first fly-wheel; a toothed pinion secured to said second fly-wheel; a first pitman operating said first fly-wheel, and a second pitman operating said second fly-wheel, of the drive-shaft journaled in said engine-casing, and a toothed wheel keyed to said drive-shaft and in mesh with said pinions, the said pinions being one-half the size of said toothed wheel.

3. In transmission-gear the combination with the engine-casing; a fly-wheel journaled therein; a stub-shaft held in said engine-casing and on which said fly-wheel has movement; a pinion provided with a hollow center suitably secured to said fly-wheel so as not to embrace bearing for same, and the engine-pitman operating said fly-wheel, of the drive-shaft journaled in said engine-casing, and a wheel keyed to said drive-shaft and receiving energy from said pinion.

4. In transmission-gear, the combination with the engine-casing; a first fly-wheel journaled in said engine-casing; a stub-shaft for same; a second fly-wheel journaled in said engine-casing; a stub-shaft for same; a toothed pinion secured to said first fly-wheel and on the outside thereof; a toothed pinion secured to said second fly-wheel, and on the outside thereof; a first pitman operating said first fly-wheel, and a second pitman operating said second fly-wheel, of the drive-shaft journaled in said engine-casing, and a toothed wheel keyed to said drive-shaft and in mesh with said pinions, the said pinions being one-half the size of said toothed wheel.

5. In transmission-gear, the combination with the engine-casing; a first fly-wheel journaled in said engine-casing; a stub-shaft for same; a second fly-wheel journaled in said engine-casing; a stub-shaft for same; a toothed pinion provided with a hollow center, secured on the outside of said first fly-wheel; a toothed pinion, provided with a hollow center, secured on the outside of said second fly-wheel; a first pitman operating said first fly-wheel, and a second pitman operating said second fly-wheel, of the drive-shaft journaled in said engine-casing, and a toothed wheel keyed to said drive-shaft and in mesh with said pinions, the said pinions being one-half the size of said toothed wheel.

6. In transmission-gear, the combination with the engine-casing; a first fly-wheel journaled in said engine-casing; a stub-shaft for same; a second fly-wheel journaled in said engine-casing; a stub-shaft for same; a pinion secured on the outside of said first fly-wheel; a pinion secured on the outside of said second fly-wheel; a first pitman operating said first fly-wheel, and a second pitman operating said second fly-wheel, of the drive-shaft journaled in said engine-casing, and a wheel keyed to said drive-shaft and receiving energy from said pinions.

In testimony whereof I have signed my name to this specification in the presence of two subscribing witnesses.

ANSON GROVES RONAN.

Witnesses:
EGERTON R. CASE,
WILMOT R. BLACKHALL.